United States Patent [19]
Watson

[11] 3,965,983
[45] June 29, 1976

[54] SONIC FLUID LEVEL CONTROL APPARATUS

[76] Inventor: Billy Ray Watson, Box 756, Monahans, Tex. 79756

[22] Filed: Dec. 13, 1974

[21] Appl. No.: 532,502

[52] U.S. Cl. ................................ 166/250; 166/64; 166/314; 417/36
[51] Int. Cl.² ........................................ E21B 47/00
[58] Field of Search ............ 73/151, 290 V; 166/53, 166/64, 250, 253, 314; 181/101, 124, 123, 402; 417/12, 36

[56] References Cited
UNITED STATES PATENTS

| | | | |
|---|---|---|---|
| 2,240,607 | 5/1941 | Buck | 417/12 |
| 2,316,494 | 4/1943 | Tipton | 417/12 |
| 2,456,456 | 12/1948 | Smith | 166/314 |
| 2,661,697 | 12/1953 | Long et al. | 73/151 |
| 2,737,256 | 3/1956 | Simmons | 73/151 |
| 2,988,640 | 6/1961 | Steele | 73/155 |
| 3,127,842 | 4/1964 | Bodine | 166/314 |
| 3,208,349 | 9/1965 | Burnett et al. | 181/124 |
| 3,333,237 | 7/1967 | Chapman | 73/151 |
| 3,509,764 | 5/1970 | Baldwin et al. | 166/250 |
| 3,635,081 | 1/1972 | Gibbs | 73/151 |

*Primary Examiner*—Frank L. Abbott
*Assistant Examiner*—Jack E. Ebel
*Attorney, Agent, or Firm*—Marcus L. Bates

[57] ABSTRACT

Pump-off control apparatus for preventing cavitation of a sub-surface pump which provides artificial lift for fluid produced from a fluid bearing strata located downhole in a borehole. A sound wave is focused downhole and travels down the casing annulus where it strikes the liquid surface and rebounds to a receiver located near the well head. The time lapse of the traveling wave is used to measure the relative location of the liquid surface relative to the pump inlet, thereby enabling the control apparatus to shut-in a well before it can encounter a pump-off condition which can cause fluid pounding.

10 Claims, 6 Drawing Figures

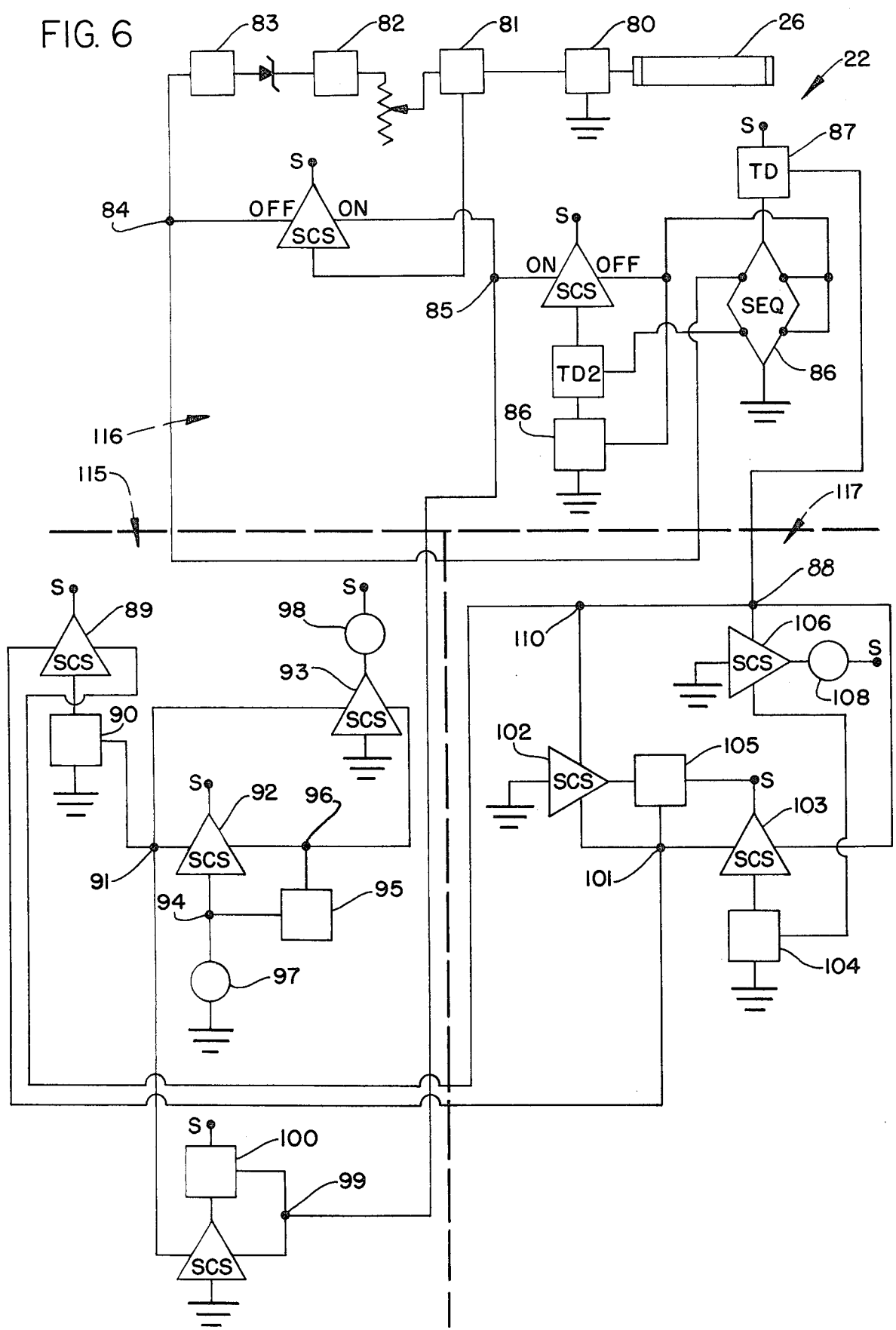

SONIC FLUID LEVEL CONTROL APPARATUS

BACKGROUND OF THE INVENTION

The present invention comprises improvements in fluid level detection and control means. Control of pumping apparatus in response to fluid level is referred to as "pump-off control means." Various mechanical, electro-mechanical, and electronic apparatus have been proposed for controlling the action of a pump located downhole in a borehole. Some apparatus are extremely complex in nature and invariably monitor various perimeters directly and indirectly associated with pumping action. The present invention avoids use of these indirect measurements employed by the prior art and goes directly to the heart of the problem, namely, directly measuring the distance from the surface of the ground to the fluid level, which also is a measure of the fluid level respective to the fluid-bearing formation and hence to the sub-surface pump itself.

SUMMARY OF THE INVENTION

The present invention generally relates to both method and apparatus for a pump-off control. The apparatus generates a sound wave which is focused downhole in a borehole annulus so that the sound wave travels down the wellbore annulus, strikes the surface of the fluid contained therewithin, returns back up the annulus to the surface of the earth, where the wave is detected and the time lapse thereof utilized to control the prime mover of the pump apparatus.

More specifically, this invention provides a pump-off control for a sub-surface pump by compressing gas in a vessel with the pump apparatus, and using the rate of accumulation of gas within the vessel to control part of the pumping cycle. The compressed gas is used in sonically sounding the borehole. Circuitry measures the liquid level in the well and controls part of the pumping cycle by determining the shut-in time interval during which time the liquid level in the well increases to a value to provide a sufficient volume of fluid for the next production cycle.

Accordingly, a primary object of the present invention is the provision of improvements in pump-off control of a producing well.

Another object of the invention is to provide a combination of a pumpjack, sonic sounding system, and electronic circuitry which cooperate together to produce fluid from a well bore in a new and novel manner.

A further object of this invention is to disclose and provide a system of operation for a sub-surface pump apparatus which improves production from a well bore.

A still further object of this invention is to provide a sonic apparatus for use as a pump-off control where artificial lift is used in conjunction with a well bore.

Another and still further object of this invention is to provide an apparatus for controlling the cyclic operation of a pumpjack.

These and other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

In the figures of the drawing.

FIG. 6 illustrates circuitry which can be used in conjunction with the foregoing figures.

DETAILED DESCRIPTION OF THE INVENTION

Figure 1:
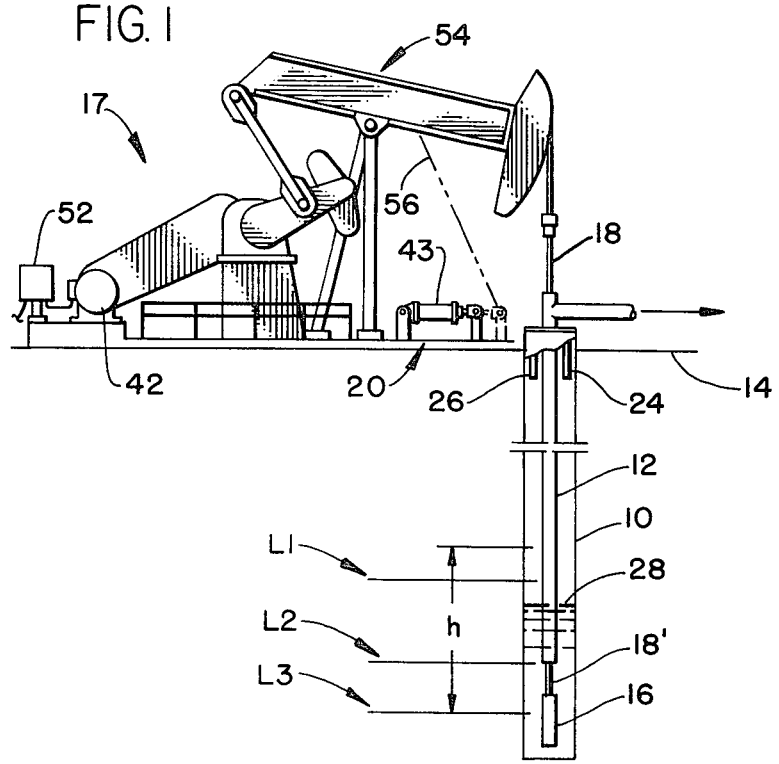
FIG. 1 is a part diagrammatical, part schematical illustration of one operative configuration of the invention utilized in conjunction with a downhole pump.

In FIG. 1, a borehole 10 is cased in the usual manner and has production tubing 12 extending from the surface of the earth 14 downhole to a pump apparatus 16. The pump apparatus can be a free or fixed downhole fluid actuated pump, a submersible pump, or a pumpjack apparatus 17 having a polished rod 18 to which a sucker rod 18' is attached thereto in the usual manner.

Figure 4:
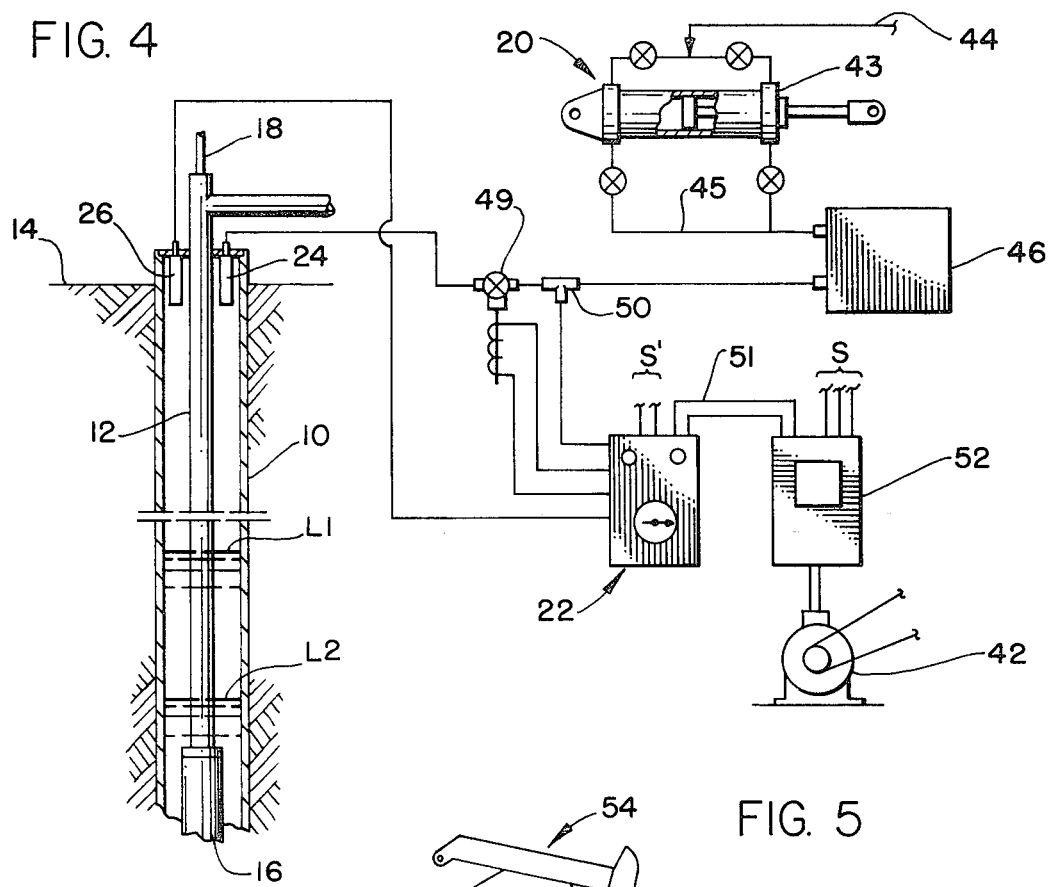
FIG. 4 is a more detailed diagrammatical representation of part of the apparatus utilized in conjunction with FIG. 1.

As seen in FIG. 4, together with other figures of the drawings, a sonic wave producing apparatus 20 is operatively associated with detection and control apparatus 22 so that a sonic wave is generated at 24 and detected at 26. Hence a wave travelling from the surface of the earth to the fluid level 28 is reflected or bounced back to the surface of the earth where it is treated, analyzed, and utilized in accordance with the present invention.

Figure 2:
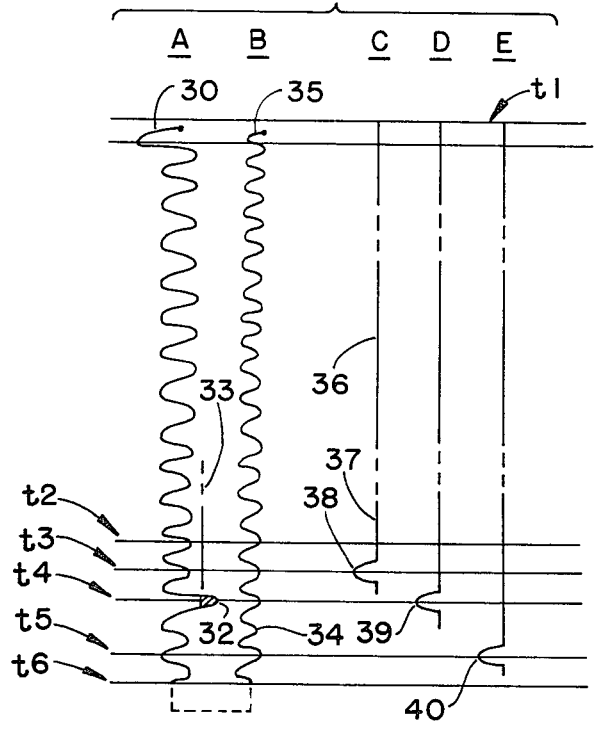
FIG. 2 is a hypothetical diagrammatical representation of some of the theory associated with the apparatus of the invention.

As best seen in FIG. 2 of the drawings, the apparatus 24 generates an initial large wave impulse 30 which decays at 31 and travels downhole through the borehole where it strikes fluid level 28, thereby generating a relatively large impulse 32 which travels back towards the surface of the earth as a wave form 34, to where it is received at 35.

Figure 3:
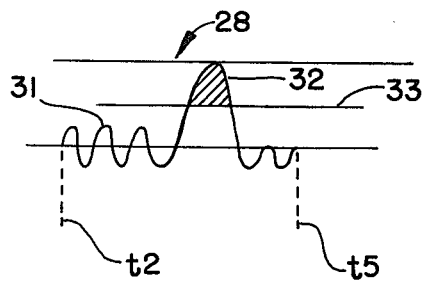
FIG. 3 is an enlarged illustration of part of the wave form illustrated in FIG. 2.

In FIG. 3, the numeral 33 broadly indicates the resultant effect of an electronic filtering system which treats the amplitude of the reflected wave in such a manner that extraneous noises and interference from collars, gearboxes, rod slap, and the like are removed, thereby eliminating false signals from being received by the control apparatus.

An electronic timer apparatus, the details of which will be presented later on in this disclosure, commences analyzing the reflected wave form at T2 so that the wave form is analyzed during time intervals T3, T4, T5, with the timing apparatus cutting off at T6. This expedient enables the circuitry to monitor a fluid level which cycles between the levels L1 and L2, thereby preventing or avoiding the fluid level from ever reaching a pump-off condition L3. Stated differently, borehole history of the production formation indicates that an optimum fluid level L1 is generated by the formation, and that production efficiency is attained down to fluid level L2. Therefore, it is desirable that fluid level 28 be maintained between the limits L1 and L2, and that a pump-off condition L3 never be encountered. The hydrostatic head "$h$" is indicated in FIG. 1.

Therefore, detector 26 is arranged to provide a signal to an electronic timer which treats and analyzes the wave form of FIG. 2 wherein the various curves thereof represent the time interval for that lapsed time portion T2-T5 to be received by detector 26. As seen in FIG. 2 C-D, the numeral 36 indicates that wave form 31 of FIG. 2A is obscured so that the circuitry cannot "see" it until time interval T2, hence the circuitry analyzes the wave form from T2 to T5. If fluid level 28 is between the desired limits L1 and L2, then wave form 32 will be produced during this time interval T3-T5. Wave form 28 is treated by apparatus 22 so that the circuitry receives that portion of the amplitude of the wave indicated above line 33.

In FIGS. 2C-2E the fluid level 28 lies at level 38, 39, or 40, with the blips at 38, 39, and 40, being related to amplitude portion 32.

Figure 5:
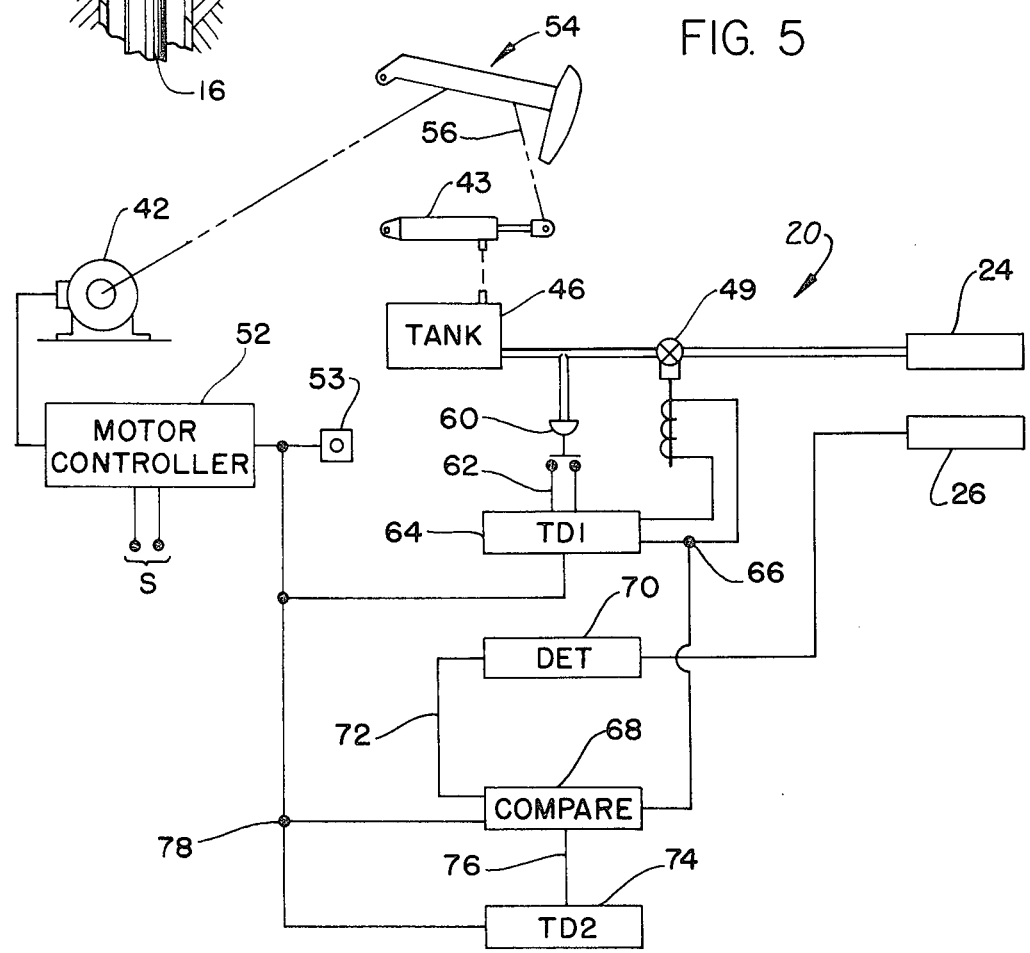
FIG. 5 is a diagrammatical illustration of another form of the invention.

In FIGS. 1, 4, or 5, the pumpjack apparatus is of usual construction and is provided with a prime mover 42 and the usual gearboxes, Sampson posts, cranks, cross-arms, horse heads, and the like. Compressor means 43 is connected in any suitable manner to be moved by one of the moving parts associated with the pumpjack apparatus, as for example, the illustrated cross-head. Flow conduits 44 and 45 are connected so that casing head gases are compressed to a pressure differential of about 50 psig within a vessel 46. Solenoid actuated control valve 49 is flow connected to the T fitting 50 and to the sonic wave producing gun apparatus at 22 so that the control at 22 can actuate the valve 49, thereby sending the frontal wave down the borehole in the previously described manner.

The controller is connected at 51 to the prime mover starter or motor controller 52 so that the illustrated source of current "s" can be interrupted whenever the pump-off controller assumes a particular electromechanical configuration in response to the signal received at 26.

FIG. 4 generally represents one mode of operation of the apparatus of FIG. 1 wherein there is broadly set forth apparatus which cooperates with the artificial lift apparatus in the following manner:

The sound wave travels downhole in the before described manner. Assuming sea level propagation of sound at ambient conditions through air (which, of course, would not be realized in a hydrocarbon producing borehole) and further assuming that the borehole is 11,000 feet in depth to fluid level L1 and with fluid level L2 lying 550 feet therebelow, it is evident that at 1,100 feet per second, ten seconds lapse time will occur in order for the frontal wave to travel from the surface of the earth to fluid level L1; and, an additional 10 seconds will be required for frontal wave to travel back to the surface of the earth. When the fluid level reaches L2, an additional one second lapse in time must expire between the signal making the round trip from L1 to L2. Hence, a rather enormous length of time is provided during the lapsed time T2-T5 or T3-T5, as illustrated in FIG. 2. This relatively large time lapse ratio greatly reduces the criticality of the circuit components and provides for extremely satisfactory control of the selected operating variables T1-T6, L1-L3, and the controller apparatus.

The signal from the microphone or dectector 26 goes to circuitry at 22 where it is treated and amplified so that the small pulses 31 are filtered out, leaving only the large pulse 32, which is passed on through the remaining circuitry. When valve 49 is first actuated, there is an extremely large sound impulse 30 which must not be treated by the entire circuitry; otherwise, confusion between 32 and 30 would exist. Accordingly, a first time delay means is provided which prevents the passing of any signal on to the remaining circuitry other than the signal generated between the limits T2-T6. Any wave generated by collars and the like and any undue background noise must be filtered out; therefore, a filter means is arranged with a cutout amplitude indicated by horizontal line 33 of FIGS. 2 and 3.

In FIG. 5, a low-slip motor 42 drives a gear box which reciprocates the walking beam 54 in the usual manner, and is controlled by motor controller 52. Manual start switch 53 is connected to initiate the pumping action by means of the usual motor controller or starter 52. The double acting gas pump 43 can be mounted to the Sampson post where it can be actuated by the oscillatory movement of the beam, and is sized respective to reservoir 46 so that 50 psig differential above the casing annulus is effected in a finite number of minutes pumping time. This "run" time lapse provided by the capacity of the vessel 46 can be adjusted to an optimum value according to the history of the production formation.

Upon tank 46 reaching operative maximum pressure, pressure sensitive switch 60 closes contacts 62 and energizes first time delay means 64, which shuts in the well by de-energizing the motor controller. After the well has been shut in for about one minute, junction 66 is energized by 64, thereby actuating solenoid 49 to supply the gas gun with the contents of the tank, and simultaneously energizes circuit 68, which soon thereafter commences monitering receiver 26. A signal is produced by the receiver or detector by the sound wave 32 which rebounds from the liquid surface 28. The signal is treated by the detecting circuitry 70 to thereby provide a signal at conductor 72 for the circuitry 68. The last circuit means compares the time lapse T2-T6, and if the blip 38, 39, or 40 is at a suitable level, the pump is immediately energized by a signal produced at junction 78 so that another pumping cycle is commenced. If the liquid level is too low to avoid a pump-off condition during the next cycle of operation, as for example, at numeral 40, a second time delay circuitry 74 will be energized by circuit means 68 by a signal produced along conductor 76, thereby shutting in the well for several additional minutes to enable sufficient accumulation of well fluid in the borehole. Ideally, the well will be cyclically produced so that the fluid level fluctuates between its most efficient hydrostatic head L1 and L2.

FIG. 6 presents circuitry 22 broadly representative of one form of electronic components suitable for carrying out the present invention, wherein those skilled in the art will be enabled to fabricate various different arrangements therefrom.

The signal from detector 26 is treated by amplifiers 80, 81, and 82, filtered at 83, so that the signal seen at junction 84 corresponds to portion 32 of the amplified sound wave. A silicon control switch, hereinafter called an "SCS," is connected to a source of current and placed between amplifier 81, junction 84, and junction 85.

Time delay reset sequence circuitry 86 is connected to time delay device TD2 and to the sequence circuitry, while the latter is connected to time delay device 87 and to junction 88.

SCS 89 is connected to a long cycle relaxation oscillator 90, which in turn is connected to junction 91, which connects together the three illustrated SCS devices. The "off" side of the three SCS devices are tied together, with element 92 being connected to junction 94, which in turn is connected to a time delay to reset the sounder, broadly indicated by numeral 95. The last time delay is connected at junction 96 to the SCS 93 and at junction 94 to the sound relay 97. Sound relay 98 is connected to a suitable source of current and is in the "off" position while relay 97 is in the "on" position.

Junction 85 is connected to junction 99 so that the first time delay 100 can be connected to junction 85 and to junction 91 through the illustrated SCS.

Junction 101 is connected to SCS 102, 103, and 89. The time delay 104 provides an appropriate lapse of time to check the fluid level. The time delay 105 is the pump "time off" and is connected to suitable source of current, to junction 101, and to the SCS 102. SCS 106 is connected to a time delay 104, junction 88, and to a relay 108. The relay is connected to a suitable source of current. SCS 106 is connected to SCS 102 by means of junctions 88 and 110.

In the operation of the embodiment of the invention which is embraced within the circuitry of FIG. 6, assuming the well has just shut down because of a low fluid level, the pump "time-off" 105 will be activated for a given length of time, based on the history of the well, so that downhole fluid can accumulate. After the time delay has run out, a pulse goes to the SCS 102, signifying the shut-in time has ended. This de-activates TD 105 and provides SCS 103 with current, which activates time delay 104. The last time delay allows the depth to the fluid level to be checked by the remainder of the system before the pumping action is resumed.

The pulse from TD 105 also goes to SCS 89, which activates the long cycle relaxation oscillator 90, which puts out pulses at a predetermined time interval, for example, each 3 minutes while it is activated. Simultaneously, a pulse is received for actuating the SCS connected to the first time delay 100 so as to prevent the initial large signal 30 from being confused with signal 32. Only about one second time interval is required for attaining this desirable result, and thereafter, the first time delay 100 will put out a pulse which actuates both SCS devices connected to junction 85. One of the switches activates the amplifier and filter system, which allows any signal received from the well bore to be processed. The other SCS is activated if after a predetermined time delay, (which coincides with a desired minimum fluid level), a signal is received to cause the second TD to be activated. The second TD provides a signal causing the sequence circuit connected to time delay 87 to compare the pulse from junction 84 and the pulse from the second time delay device in the order of their sequential operation. The second time delay puts out a pulse or signal which exactly coincides with a predetermined or desired fluid level; and accordingly, to activate the sequence circuit, a pulse must first be received from the second time delay, and at a later time, a pulse must be received from junction 84. These pulses must be received by the sequence circuit in the above described order or the sequence circuit will not activate. When the signals are received in the above prescribed order, the fluid level must accordingly be at too low a satisfactory level for initiating or resuming production for the reason that the signal received by the detector required a longer time interval then the remaining signal. Conversely, if the signal received by the microphone is effected at the sequence circuit before the pulse arrives from the second TD, the sequence circuit will not activate, because the fluid level is at or above the minimum desired level for proper resumption of production, because of the time intervals involved.

Time delay circuit 86 is activated simultaneously with the second time delay and is utilized to reset the sequence circuitry after the pulses have been compared. Time delay circuit 87 provides a signal if the sequence circuit is activated. If the sequence circuit does not provide a signal after the first pulse is received from the long cycle relaxation oscillator, the time delay 104 (to check the fluid level) will time out and provide a signal to activate the SCS 106, which in turn will activate the main motor relay 108, which turns on the motor controller or starter to the electric motor, thereby placing the pumpjack unit back on its production cycle.

If a pulse passes through sequence circuit, thereby indicating that the fluid level is insufficient for resumption of production, a signal is received at SCS 103, thereby de-activating time delay 104, which in turn fails to produce a starting signal for the motor controller relay 108. This same pulse is effected at SCS 102, which reactivates time delay 105 for another time lapse.

On the other hand, assuming that sufficient fluid has accumulated within the borehole, thereby providing a suitable fluid level for resumption of production, there will be no signal produced by the sequence circuitry and the pumping unit will commence production. Each 3 minutes during pump operation, the long cycle relaxation oscillator will send the required signal for activating the sounding device, thereby checking the fluid level against the optimum desired fluid level by the sequence circuit. When the well eventually pumps down to a level below a safe operating elevation respective to the pump inlet, the pulses will then be received by the sequence circuit in order to deactivate it, thereby activating TD 87, which is of extremely short time duration, since it needs only provide a signal which is connected to SCS 89 for de-activating the long cycle relaxation oscillator 90, while at the same time SCS 106 is provided with the same signal for stopping the pumping unit, while the SCS 102 receives the same signal which maintains the well shut-in for a sufficient time for the accumulation of fluid, while the same signal is also connected to SCS 103 to prevent TD 104 from activating during well shut-in.

I claim:

1. The combination with production apparatus associated with a wellbore and provided with a prime mover connected to actuate a pump, of a pump-off control apparatus comprising: a controller means connected to said prime mover for starting and stopping the pumping action; compressor means, a gas storage vessel connected to receive compressed gas from said compressor means, means by which said compressor means is connected to be actuated when said prime mover is energized;

a sound detector mounted at the upper extremity of the wellbore, a gas powered sound producing means focused down the wellbore to strike any downhole liquid surface and rebound back up the wellbore where it can be received by said sound detector;

a valve means connecting said sound producing means to said vessel, means including said controller means for de-energizing said prime mover and thereafter opening said valve means when the pressure differential between said vessel and said wellbore attains a magnitude which will produce said sound wave;

means, including a time delay means, for measuring the time interval required for a sound wave generated by said sound producing means to travel from the liquid surface uphole to the sound detector;

said time delay means only allows the sound detector to pass on a signal which occurs a finite time interval after said valve is opened, thereby avoiding any extremely large initial sound impulse being received by the sound detector;

means by which the prime mover is de-energized for a first time delay period when said time interval required for the sound wave to reach the sound detector is of a first value, means by which the prime mover is de-energized for a longer time delay period when said time interval required for the sound wave to reach the sound detector is of a second value; the last said time interval being indicative of a lower fluid level than the first said time interval.

2. The combination of claim 1 wherein said means for de-energizing said prime mover includes a pressure operated switch connected to said vessel for causing said controller means to stop the pumping action when the stated pressure differential is attained; and said valve means is a solenoid actuated valve;

circuit means for receiving a first signal when said valve means is opened, and for receiving another signal when the sound wave from the fluid level strikes said detector; said circuit means being connected to provide the recited means by which the prime mover is de-energized in response to the first and second value of said time interval.

3. The combination of claim 1 wherein said vessel has a displacement of a value to cause the pump to operate for a finite length of time, which is less than the time interval required for the downhole fluid reservoir to recover to a static fluid level after a pump-off condition is encountered.

4. The combination of claim 1 wherein said pump is a pumpjack apparatus and said compressor is a piston and cylinder connected for reciprocating movement thereto.

5. The combination of claim 1 wherein said pump is a pumpjack apparatus and said compressor is a piston and cylinder connected for reciprocating movement thereto;

the displacement of the vessel is of a value to cause the pump to operate for a finite length of time, which is less than the time interval required for the downhole fluid reservoir to recover after a pump-off condition is encountered.

6. Method of cyclically producing a fluid producing strata of wellbore wherein an artificial lift device is located downhole at a location which is usually below the fluid level thereof when the well is shut in, comprising the following steps:

1. starting said device and producing the well while simultaneously compressing a gas within a vessel;
2. stopping the device when the relative gas pressure differential measured between the vessel and the upper borehole annulus reaches a first value;
3. actuating a sound producing device with the gaseous contents of the vessel; and,
4. directing the sound wave downhole so that it must strike and rebound from any liquid level produced therein by the fluid producing strata;
5. detecting the rebound sound wave as it travels uphole through the borehole;
6. measuring the lapsed time required for the wave to travel from the location of the liquid level to the detecting location;
7. carrying out step (6) by measuring the sound wave detected in step (5) only during a time interval following a time delay wherein the time delay eliminates the measurement of any undesirable initial large sound impulse;
8. continuing the shut-in condition of the well for a first time interval when the lapsed time of step (6) is of a first value indicative of a pump-off condition;
9. starting the device when the lapsed time of step (6) is of a second value indicative of the presence of a hydrostatic head in the well which is of a value which will supply production fluid during the time required to carry out step (1).

7. The method of claim 6 wherein step (2) is carried out by pneumatically actuating an electric switch which electrically de-energizes the device; and, step (3) is carried out by connecting the vessel to the sound producing device by a solenoid actuated valve; and, carrying out step (3) after a suitable rest period following step (2) to thereby provide sufficient lapse of time during which extraneous noises from the pumping action of step (1) can dissipate.

8. The method of claim 6 wherein the capacity and pressure differential of the vessel of step (2) is of a value which will supply sufficient force for the sound producing device of step (3) to attain a magnitude whereby step (5) can be carried out.

9. The method of claim 6 wherein the energized cycle of the device is determined pneumatically while the de-energized cycle of the device is determined electronically.

10. The method of claim 6 wherein step (2) is carried out by using the pressure differential for actuating a pressure sensitive switch; and, step (3) is carried out by connecting the vessel to the sound producing device by a solenoid actuated valve, and the valve is actuated by the pressure actuated switch.

* * * * *